April 26, 1960  M. E. REINECKE ET AL  2,934,693
WATER ANALYZER

Filed Sept. 9, 1957  3 Sheets-Sheet 3

INVENTORS
M.E. REINECKE
E.H. SHOLL
BY *Hudson + Young*
ATTORNEYS

United States Patent Office
2,934,693
Patented Apr. 26, 1960

2,934,693

WATER ANALYZER

Marvin E. Reinecke and Edward H. Sholl, Bartlesville, Okla., assignors to Phillips Petroleum Company, a corporation of Delaware Application September 9, 1957, Serial No. 682,662

10 Claims. (Cl. 324—30)

This invention relates to apparatus for detecting the presence of small quantities of water in fluids.

In various industrial and laboratory processes, there is a need for a relatively simple and rapid procedure to detect trace quantities of water in fluids. The present invention is directed toward the solution of this problem. In accordance with this invention, the fluid to be analyzed is vaporized if it is present originally as a liquid. The resulting vapor is directed through a pressure regulator or flow controller and transmitted to the inlet of a cell assembly which is capable of detecting the amount of water present in the vapor. The cell assembly preferably comprises apparatus wherein the water present in the vapor is continuously absorbed and electrolyzed. The current required to electrolyze the water in the vapor is a direct function of the concentration of the water in the vapor. The vaporizer, pressure regulator and cell assembly are mounted in a compact explosion-proof housing which is maintained at a constant temperature by means of a heater and a thermostat. This insures that the vapor is directed to the sample cell at a constant rate and at a constant temperature so that an accurate analysis is accomplished.

Accordingly, it is an object of this invention to provide improved apparatus which is capable of detecting trace quantities of water in fluids.

Another object is to provide an improved water analyzer which is positioned in a compact explosion-proof housing.

Other objects, advantages and features of this invention should become apparent from the following detailed description which is taken in conjunction with the accompanying drawing in which.

Figure 1:
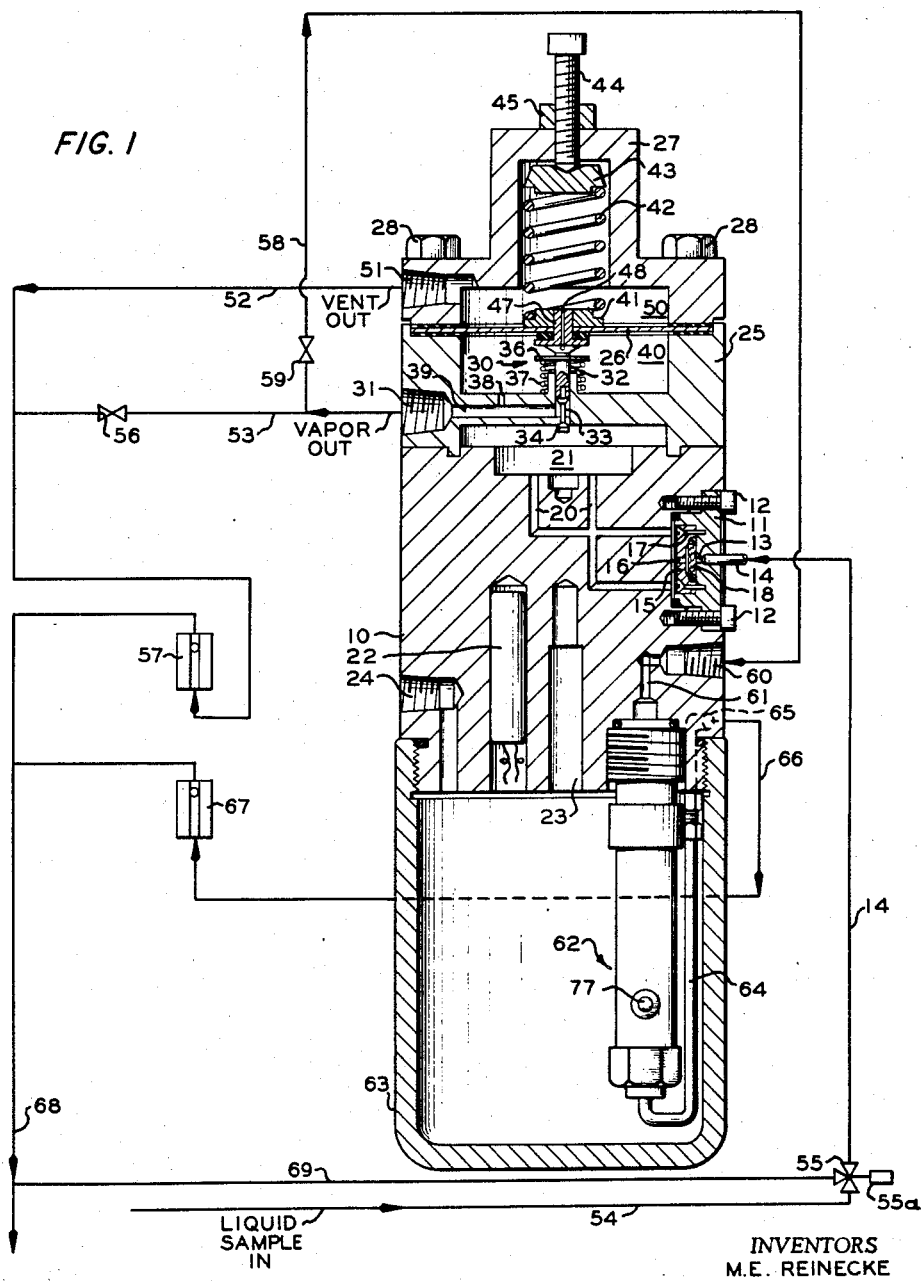
Figure 1 is a view, shown partially in section, of a first embodiment of the analyzer of this invention.

Referring now to the drawing in detail, and to Figure 1 in particular, there is shown a housing 10 of heat conductive material. A first plate 11 is mounted within a cavity in housing 10 by means of screws 12. Plate 11 is provided with an inlet 13 into which is positioned a sample inlet conduit 14. A second plate 15, having an aperture 16 therein, is attached to plate 11 by screws 17 so as to retain a filter 18 between the two plates. The cavity in housing 10 behind plate 15 is connected by a plurality of passages 20 to a chamber 21. An electrical heating element 22 is mounted within housing 10. The electrical energy applied to heating element 22 is controlled by a thermostat 23 which is also mounted in housing 10. Electrical leads, not shown, enter housing 10 through a passage 24.

A valve plate 25 is mounted above housing 10. A flexible diaphragm 26 extends across the top of plate 25, and an upper cap 27 is mounted thereon. Cap 27 and plate 25 are secured to housing 10 by a plurality of screws 28. A pressure regulator valve assembly 30 is disposed within plate 25 in a passage between chamber 21 and an outlet port 31 in plate 25. Valve assembly 30 comprises a cylindrical member 32 which carries a plunger 33 at its own lower end. Plunger 33 supports a valve head 34 which is adapted to fit into a valve seat in plate 25. A washer 36 is secured to the upper portion of member 32, and a spring 37 normally urges this washer upwardly. A passage 39 is formed in plate 25 so as to communicate between outlet port 31 and the region above valve head 34. A vent passage 38 communicates between passage 31 and a chamber 40 in plate 25 beneath diaphragm 26. A diaphragm backing plate 41 rests upon the upper surface of diaphragm 26, and a compression spring 42 extends between diaphragm backing plate 41 and a spring follower 43 which engages an adjusting screw 44 that extends through the top of cap 27. A lock nut 45 is provided on screw 44. A vent plate 47, having a bleed passage 48 therethrough, extends through a central opening in diaphragm 26. The lower surface of plate 47 normally rests upon the upper surface of cylindrical member 32 to prevent fluid from passing between chamber 40 and a chamber 50 immediately above diaphragm 26 through passage 48. A port 51 is provided in cap 27 so that chamber 50 is in communication with a vent conduit 52.

A liquid sample to be analyzed is introduced into the system through a conduit 54 which communicates with the inlet of a three-way solenoid operated valve 55. The first outlet of valve 55 is connected to inlet conduit 14. The liquid sample passes through filter 18 and into chamber 21 through passage 20. The liquid is heated and allowed to expand in this region so that vapor is formed in chamber 21. The resulting vapor passes through valve assembly 30 and is removed through outlet port 31. Compression spring 42 initially is adjusted by screw 44 so that the pressure exerted on the upper surface of diaphragm 26 is sufficient to retain valve head 34 off its valve seat by such an amount as to allow the vapor to flow therethrough at a desired rate. It should be observed that the pressure of the vapor downstream from valve assembly 30 is applied to the lower surface of diaphragm 26 through passage 38. If this vapor pressure should tend to exceed the desired value, a force is exerted on the lower surface of diaphragm 26 to overcome the force of spring 42 so as to raise plate 47 and thereby seat valve head 34. If the pressure in chamber 40 is still excessive, plate 47 is raised above member 32 to allow vapor in chamber 40 to be vented through passage 48 into chamber 50. If, on the other hand, the pressure in chamber 40 should fall below a desired value, the combined downward force of spring 42 and the fluid pressure above diaphragm 26 result in member 32 being moved downwardly to move valve head 34 further off its valve seat. The assembly thus operates to provide a vapor at a predetermined pressure.

A conduit 53, having a valve 56 therein, communicates between outlet port 31 and the inlet of a first flow meter 57. A conduit 58, having a valve 59 therein, communicates between conduit 53 upstream from valve 56 and an inlet port 60 in housing 10. Port 60 is connected by a passage 61 to the inlet of an electrolytic cell 62. Cell 62 is attached to and depends from housing 10. A cover 63 is threaded to housing 10 to enclose cell 62. The outlet of cell 62 is connected by a conduit 64 to an outlet port 65 in housing 10. Port 65 is connected by conduit 66 to the inlet of a second flow meter 67. The outlets of flow meters 57 and 67 are connected to a vent conduit 68. A conduit 69 communicates between the second outlet of valve 55 and conduit 68. Conduit 52 communicates between port 51 and the inlet of flow meter 57.

Figure 2:
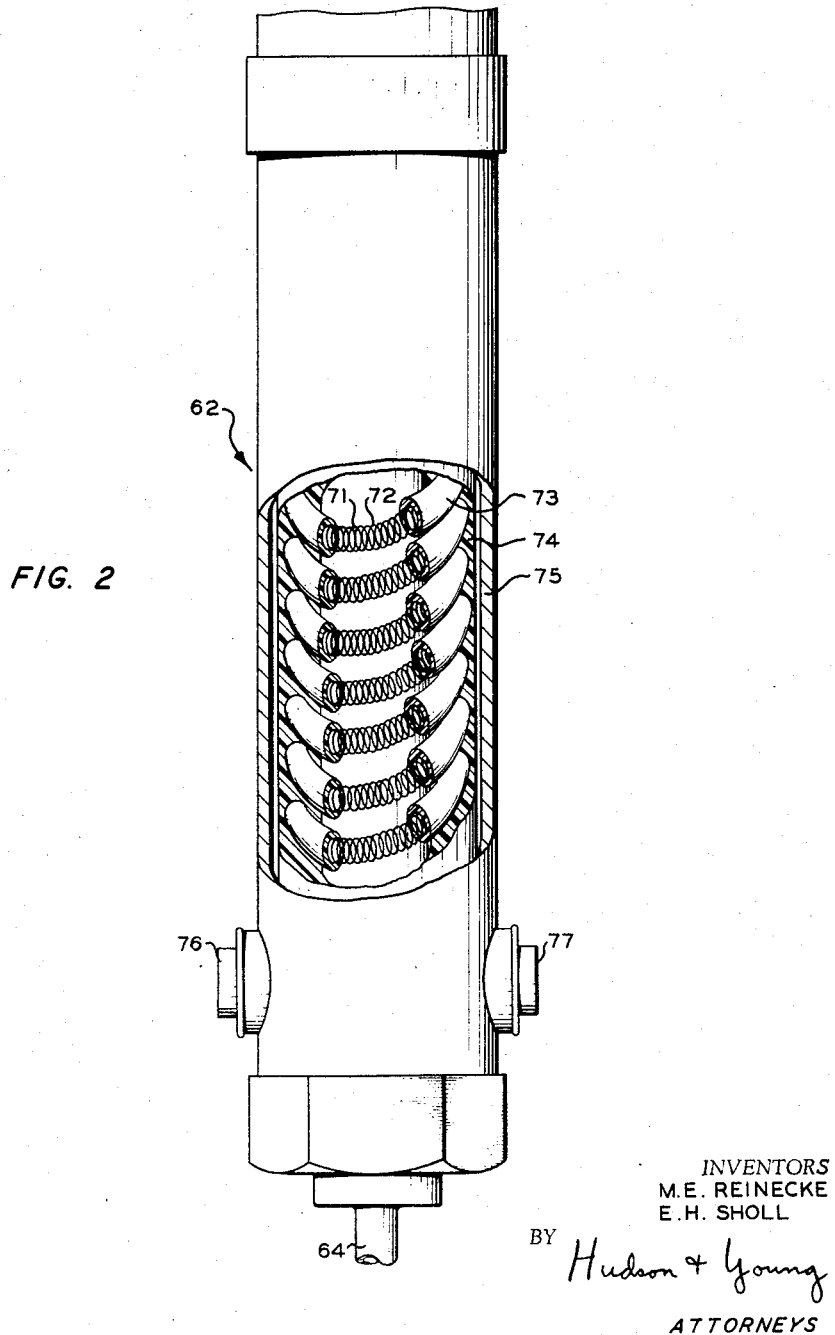
Figure 2 is a detailed view, shown partially in section, of the cell assembly of Figure 1.

Electrolytic cell 62 is adapted to measure the concentration of water in the vapor directed therethrough. This cell assembly is illustrated in Figure 2 as comprising two wires 71 and 72 which are positioned adjacent one another in an elongated path. The cell is constructed by winding these wires on a cylindrical form in spaced relationship with one another. The wires are then encased in a flexible plastic tube 73 which serves to keep the wires out of contact with one another. The form is removed and tube 73 is wound in the form of a spiral to conserve space. Tube 73 is then potted in a plastic 74 to provide a rigid structure which is enclosed in a metal housing 75. Housing 75 is provided with two conduit openings 76 and 77 to permit electrical leads, not shown, to be connected to wires 71 and 72. The inlet and outlet fluid openings of the cell assembly communicate with respective ends of tube 73. Wires 71 and 72 can advantageously be formed of a material such as platinum which is not readily corroded. A phosphoric acid solution is circulated through tube 73 to wet wires 71 and 72. A current is then passed through the wires to electrolyze the water from the phosphoric acid. Dry nitrogen is passed through the tube to remove the hydrogen and oxygen produced by electrolysis. When completely dried, a film of phosphorus pentoxide remains. This material serves to absorb any water which may be present in the vapor sample circulated through tube 73.

Figure 3:
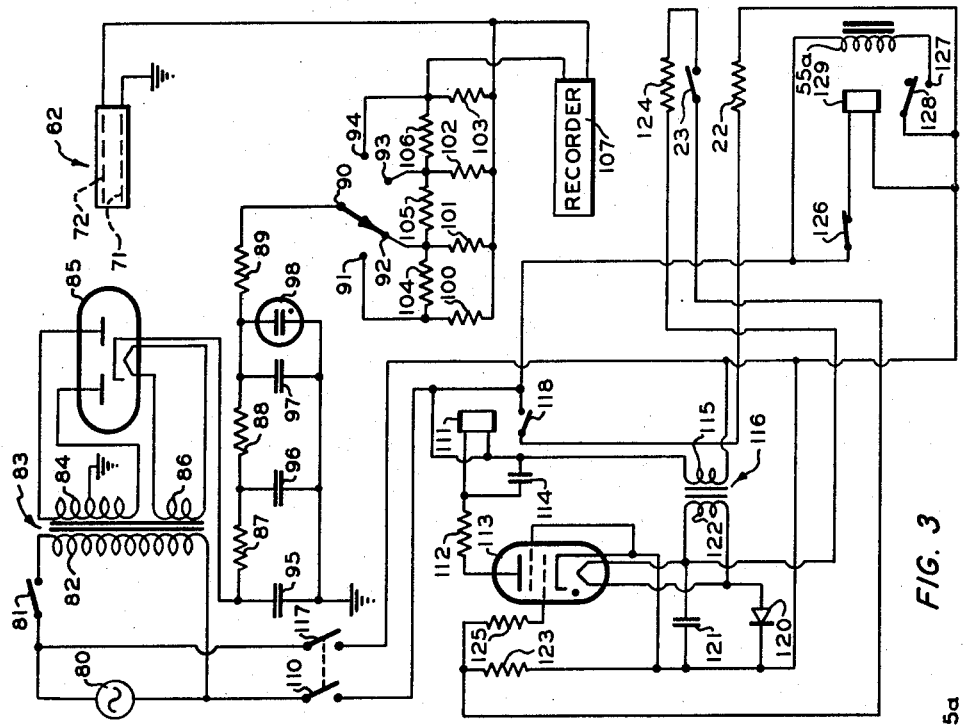
Figure 3 is a schematic circuit diagram of the electrical components of the analyzer.

The electrical components of the analyzer are illustrated schematically in Figure 3. A direct voltage is applied between wires 71 and 72, which form spaced electrodes, and the conduction therebetween due to the absorbed water being electrolyzed is a function of the concentration of water in the cell assembly. The detecting circuit is energized by a source of alternating current 80 which is connected through a switch 81 across a primary winding 82 of a transformer 83. The end terminals of the first secondary winding 84 of transformer 83 are connected to the respective anodes of a double diode 85. The center tap of transformer winding 83 is connected to ground. A second secondary winding 86 of transformer 83 energizes the filament of diode 85. The cathode of diode 85 is connected through resistors 87, 88 and 89 to a switch 90 which is adapted to engage terminals 91, 92, 93 and 94 selectively. A first capacitor 95 is connected between the cathode of diode 85 and ground; a second capacitor 96 is connected between the junction between resistors 87 and 88 and ground; and a third capacitor 97 is connected between the junction between resistors 88 and 89 and ground. A voltage regulating tube 98 is connected in parallel with capacitor 97. Switch 99 is thus maintained at a steady positive potential. Terminals 91, 92, 93 and 94 are connected to wire 72 through respective resistors 100, 101, 102 and 103. A resistor 104 is connected between terminals 91 and 92; a resistor 105 is connected between terminals 92 and 93; and a resistor 106 is connected between terminals 93 and 94. The first terminal of a recorder 107 is connected to terminal 94, and the second terminal of recorder 107 is connected to wire 72. The resistance network connected between switch 90 and cell assembly 62 thus provides a means for adjusting the magnitude of the voltage applied across wires 71 and 72. In general, an increased voltage is employed when the water concentration to be measured is relatively high. Recorder 107 provides an indication of the current flow between wires 71 and 72 which is a direct indication of the amount of water being electrolyzed in the cell assembly.

Heater 22 and thermostat 23 are employed to maintain housing 10 at a constant elevated temperature so that the liquid sample is readily vaporized. The first terminal of current source 80 is connected through a switch 110, the coil of a relay 111 and a resistor 112 to the anode of a thyratron 113. A capacitor 114 is connected in parallel with the coil of relay 111. The first terminal of current source 80 is also connected through switch 110, the primary winding 115 of a transformer 116, and a switch 117 to the second terminal of the current source. Heater 22 is connected across current source 80 through a switch 118 which is closed when relay 111 is energized. A rectifier 120 and a capacitor 121 are connected in series relationship with the secondary winding 122 of transformer 116. The filament of thyratron 113 is connected across transformer winding 122. The junction between rectifier 120 and capacitor 121 is connected through a resistor 123, thermostat 23 and a resistor 124 to the junction between capacitor 121 and transformer winding 122. The junction between resistor 123 and thermostat 23 is connected through a resistor 125 to the control grid of thyratron 112. When thermostat 23 is opened, the control grid and cathode of thyratron 113 are maintained at a common potential so that the thyratron does not conduct. When the temperature of housing 10 falls below a predetermined value, thermostat 23 closes so that current flows through resistors 123 and 124. This results in an increase in potential at the control grid of thyratron 113 so that the thyratron conducts. Conduction by thyratron 113 energizes relay 111 to close switch 118 so that heater 22 is energized. This supplies additional heat to housing 10 to tend to maintain a constant temperature.

Valve 55 is actuated by means of a solenoid 55a. One terminal of solenoid 55a is connected to switch 110. The second terminal of solenoid 55a is connected to a terminal 127 which is engaged by a switch 128 when a relay 129 is de-energized. Switch 128 and one terminal of the coil of relay 129 are connected to switch 117. The second terminal of the coil of relay 129 is connected to switch 110 through a thermostat 126 which is positioned within an opening, not shown, in housing 10. If the temperature of housing 10 should fall below a predetermined value for any reason, thermostat 126 closes so that relay 129 is energized. This de-energizes solenoid 55a to divert a sample stream into by-pass conduit 69, thereby preventing the possibility of sample coming through to the cell when the temperature of housing 10 is below the vaporizing point. The system is also fail-safe in case of power failure.

Figure 4:
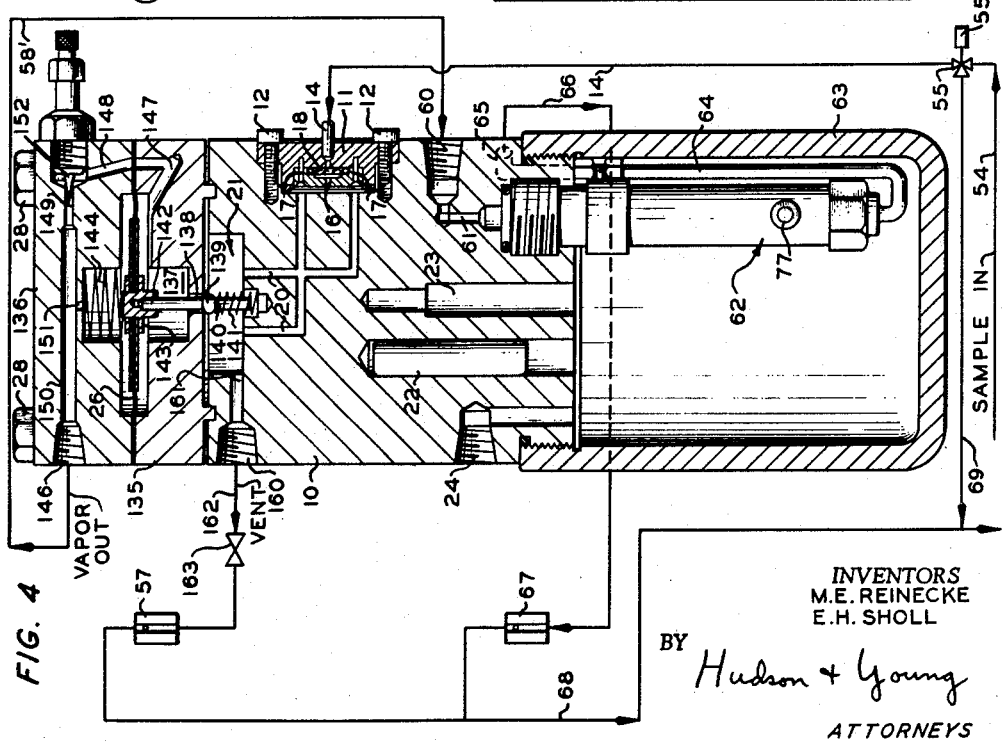
Figure 4 is a view, shown partially in section, of a second embodiment of the analyzer.

In Figure 4 there is shown a second embodiment of the vaporizer and pressure regulating apparatus. The vaporizing portion of the apparatus of Figure 4 is identical to that shown in Figure 1 and corresponding elements are designated by like reference numerals. A valve plate 135 is positioned above housing 10, and a top plate 136 is positioned above plate 135. Plates 135 and 136 are secured to housing by means of screws 28. A flexible diaphragm 26 is positioned between plates 135 and 136. Valve plate 135 is provided with a hollow chamber 137 below diaphragm 26. Chamber 137 communicates with chamber 21 in housing 10 through a passage 138 which forms a valve seat at its lower end. A valve head 139 is positioned in chamber 21 to engage the valve seat at the lower end of passage 138. A valve pin 140 extends downwardly from valve head 139 into a recessed portion of housing 10. A compression spring 141 encloses pin 140 and exerts an upward force on valve head 139 which tends to keep the valve head seated.

A rod 142 extends upwardly from valve head 139 to engage a diaphragm backing plate 143. A compression spring 144 is positioned in the region above diaphragm 26 to exert a downward force on the diaphragm. This force tends to unseat valve head 139. Chamber 137 communicates with an outlet port 146 in plate 136 through connected passages 147, 148, 149 and 150. A passage 151 communicates between passage 150 and the region above diaphragm 26. The cross-sectional area of passage 149 can be adjusted by a needle valve 152.

The vaporized fluid in chamber 21 passes upwardly through passage 138 when valve head 139 is unseated. This fluid is then transmitted to outlet port 149 at a rate which is determined by the setting of needle valve 152. The pressure drop across the needle valve is a function of the velocity of fluid flow and the cross-sectional area of the passage. The pressure in passage 150 is applied to the upper side of diaphragm 26, and the pressure in chamber 137 is applied to the lower side of diaphragm 26. Valve 152 is adjusted initially so that a pressure differential exists such that valve head 139 is unseated sufficiently to allow a predetermined flow through the assembly. If the flow of vapor should tend to increase, there is a greater pressure drop across the needle valve so that diaphragm 26 tends to move upwardly. This tends to seat valve head 139 to reduce the rate of flow. If the flow should tend to decrease, there is less pressure drop across the diaphragm so that valve head 139 moves downwardly. In this manner the assembly functions to maintain a desired flow of the vaporized fluid.

Outlet port 146 is connected by a conduit 58' to inlet port 60. A vent port 160 in housing 10 communicates with chamber 21 through a passage 161. Port 160 is connected by a conduit 162, which has a valve 163 therein, to the inlet of a flow meter 57. This conduit removes a substantial portion of the vaporized fluid continuously. In this manner, a larger volume of sample fluid can be transmitted through the vaporizer assembly to reduce the time lag of the sample flow through the analyzer cell. The flow through conduit 161 is maintained constant by adjustment of valve 163.

In view of the foregoing description it should be evident that there is provided in accordance with this invention an improved analyzer which is capable of detecting small amounts of water in test fluids. The fluid to be analyzed is vaporized and passed to the cell assembly at a constant temperature and at a constant rate. This apparatus has been found to be capable of detecting water in concentrations as low as one part per million.

While the invention has been described in conjunction with present preferred embodiments, it should be evident that it is not limited thereto.

What is claimed is:

1. Apparatus for detecting water in fluid samples comprising a block of heat conductive material having a fluid passage therethrough, said passage including an expansion chamber, heating means in thermal contact with said block to vaporize liquid flowing into said expansion chamber, conduit means having spaced electrodes therein, material capable of absorbing water disposed within said conduit means, means to apply a voltage across said electrodes, means to measure current flow between said electrodes, and flow control means positioned between the outlet of said passage and said conduit means to pass vapor from said passage through said conduit means at a predetermined rate.

2. Apparatus for detecting water in fluid samples comprising a block of heat conductive material having a fluid passage therethrough, said passage including an expansion chamber, heating means in thermal contact with said block to vaporize liquid flowing into said expansion chamber, a thermostat in thermal contact with said block to control said heating means to maintain said block at a predetermined temperature, conduit means having spaced electrodes therein, means positioning said conduit means in thermal contact with said block, material capable of absorbing water disposed within said conduit means, means to apply a voltage across said electrodes, means to measure current flow between said electrodes, and flow control means positioned between the outlet of said passage and said conduit means to pass vapor from said passage through said conduit means at a predetermined rate.

3. The apparatus of claim 2 wherein said flow control means comprises means forming a first chamber in communication with the outlet of said passage, means forming a second passage, means forming a second chamber in communication with said second passage, means forming a third chamber adjacent said second chamber, a diaphragm separating said second and third chambers, means forming a vent passage in communication with said third chamber, a first valve between said first chamber and said second passage, means urging said diaphragm toward said second chamber, means connecting said first valve to said diaphragm so that movement of said diaphragm toward said second chamber tends to open said first valve, a second valve between said second and third chambers, means connecting said second valve to said diaphragm so that movement of said diaphragm toward said third chamber tends to open said second valve, and a second conduit connected between said second passage and the inlet of said conduit means.

4. The apparatus of claim 3 further comprising a third valve in said second conduit, a vent conduit communicating with said second passage, and a fourth valve in said vent conduit, said third and fourth valves permitting adjustment of the relative flows through said conduit and said vent conduit.

5. The apparatus of claim 2 wherein said flow control means comprises means forming a first chamber in communication with the outlet of said passage, means forming a second chamber adjacent said first chamber, means forming a third chamber adjacent said second chamber, a diaphragm separating said second and third chambers, means urging said diaphragm toward said second chamber, a first valve between said first and second chambers, means connecting said first valve to said diaphragm so that movement of said diaphragm toward said second chamber tends to open said first valve, a conduit communicating between said second chamber and the inlet of said conduit means, an adjustable valve in said second conduit, and means forming a passage between said third chamber and said conduit downstream from said adjustable valve.

6. The apparatus of claim 5 further comprising a vent conduit communicating with said first chamber, and a third valve in said vent conduit, said adjustable valve and said third valve permitting adjustment of the relative flows through said conduit and said vent conduit.

7. Apparatus for detecting water in fluid samples comprising a metal block having a fluid passage therethrough, a filter positioned across the inlet of said passage, said passage including an expansion chamber, an electrical heating element mounted within said block, a thermostat mounted within said block, means responsive to said thermostat to energize said heating element to maintain said block at a constant temperature, conduit means having spaced electrodes therein, means positioning said conduit means in thermal contact with said block, material capable of absorbing water disposed within said conduit means, means to apply a voltage across said electrodes, means to measure current flow between said electrodes, and flow control means positioned between the outlet of said passage and said conduit means to pass vapor from said passage through said conduit means at a predetermined rate.

8. The apparatus of claim 7 wherein said material capable of absorbing water comprises phosphorus pentoxide.

9. The apparatus of claim 7 wherein said conduit means having spaced electrodes therein comprises a tube of electrically insulating material, and first and second spiral coils of wire extending longitudinally through said tube in spaced relationship with one another, said wires forming said electrodes, and wherein said material capable of absorbing water is disposed between said coils of wire.

10. The apparatus of claim 7 further comprising a second conduit communicating with the inlet of said passage through said filter, a valve in said second conduit, temperature responsive means in thermal contact with said block, and means responsive to said temperature responsive means to close said valve when the temperature of said block falls below a predetermined value.

References Cited in the file of this patent
UNITED STATES PATENTS

| | | |
|---|---|---|
| 2,303,572 | Mumford et al. | Dec. 1, 1942 |
| 2,334,926 | Hines et al. | Nov. 23, 1943 |
| 2,742,541 | Bunting | Apr. 17, 1956 |
| 2,806,991 | White | Sept. 17, 1957 |
| 2,830,945 | Keidel | Apr. 15, 1958 |